United States Patent
LaBarge et al.

(10) Patent No.: US 7,253,137 B2
(45) Date of Patent: Aug. 7, 2007

(54) PROX CATALYST FOR OXIDIZING CARBON MONOXIDE

(75) Inventors: William J. LaBarge, Bay City, MI (US); Robert J. Svoboda, Swartz Creek, MI (US); Joseph M. Keller, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/487,195

(22) Filed: Jul. 14, 2006

(65) Prior Publication Data

US 2006/0258530 A1    Nov. 16, 2006

Related U.S. Application Data

(62) Division of application No. 10/310,425, filed on Dec. 5, 2002, now Pat. No. 7,105,468.

(51) Int. Cl.
| | |
|---|---|
| *B01J 23/44* | (2006.01) |
| *B01J 23/56* | (2006.01) |
| *B01J 23/58* | (2006.01) |
| *B01J 21/04* | (2006.01) |
| *H01M 4/00* | (2006.01) |

(52) U.S. Cl. .................. 502/328; 502/330; 502/332; 502/333; 502/334; 502/339; 502/355; 502/415; 502/439; 502/527.24; 429/44

(58) Field of Classification Search ............... 502/328, 502/330, 332–334, 339, 355, 415, 439, 527.24; 429/44

See application file for complete search history.

(56) References Cited

U.S. PATENT DOCUMENTS

| 5,232,357 | A  * | 8/1993 | Dalla Betta et al. ............. 431/7 |
| 5,753,580 | A  * | 5/1998 | Hayashi et al. ............. 502/304 |
| 6,069,111 | A  * | 5/2000 | Yamamoto et al. ......... 502/333 |
| 6,284,210 | B1 * | 9/2001 | Euzen et al. ............. 423/213.5 |
| 6,348,430 | B1 * | 2/2002 | Lindner et al. ............. 502/304 |
| 6,559,579 | B2 * | 5/2003 | Ito et al. ..................... 313/143 |
| 6,774,080 | B2 * | 8/2004 | LaBarge et al. ............ 502/170 |

* cited by examiner

*Primary Examiner*—Cam N. Nguyen
(74) *Attorney, Agent, or Firm*—Paul L. Marshall

(57) ABSTRACT

A catalyst for preferentially reducing carbon monoxide in a hydrogen stream. The catalyst is formed from a chemical composition including a hexaaluminate, a metal hydroxide and a precious metal. The composition may be disposed on a support or may be extruded or cast into or onto a support. Incorporation of hexaaluminates allows inclusion of metal hydroxides that flux the active precious metal surface at higher temperatures than can aluminum oxide-based catalytic compositions, thereby enhancing resistance of the catalyst and monolithic support and increasing the durability and thermal range of the PROX catalyst. An additional advantage is that lesser amounts of precious metal oxides need be deposited onto the hexaaluminate, while retaining activity similar to aluminum oxide compositions.

5 Claims, No Drawings

PROX CATALYST FOR OXIDIZING CARBON MONOXIDE

This application is a division of U.S. patent application Ser. No. 10/310,425, filed Dec. 5, 2002, now U.S. Pat. No. 7,105,468.

TECHNICAL FIELD

The present invention relates to catalysts for reforming hydrocarbons to produce fuel for powering fuel cells; more particularly, to such catalysts for preferentially oxidizing (PROX) carbon monoxide in mixtures containing hydrogen and carbon monoxide; and most particularly, to PROX catalysts containing a hexaaluminate, a metal hydroxide, and a precious metal.

BACKGROUND OF THE INVENTION

It is well known in the art to partially oxidize ("reform") hydrocarbons such as, for example, gasoline, and to yield a gaseous mixture of fuel gases ("reformate") including hydrogen and carbon monoxide. Such reformate, as generated, is useful as a fuel for a class of fuel cells known in the art as "solid-oxide fuel cells" (SOFC) wherein both hydrogen and carbon monoxide are oxidized by migration of an oxygen anion to produce electric power.

Another class of fuel cells, known as "proton exchange membrane" (PEM) fuel cells, is incapable of utilizing raw reformate containing carbon monoxide. Such fuel cells contain large amounts of precious metals which can become irreversibly poisoned by carbon monoxide. Thus, the higher the expected carbon monoxide level in the hydrogen stream, the greater the necessary amount of precious metal loadings in the catalyst. A motor vehicle using a fuel cell fueled with a pure hydrogen stream may need no more than, for example, $5000 worth of precious metals, whereas a motor vehicle using a fuel cell fueled with a hydrogen stream containing 20 ppm carbon monoxide may need more than $20,000 worth of precious metals.

Therefore, for PEM fuel cells, it is highly desirable to remove carbon monoxide from the hydrogen fuel feed stream, typically by preferential oxidation (PROX) catalysis to carbon dioxide, ahead of entry of the fuel stream into the fuel cell.

U.S. Pat. No. 6,162,558, issued Dec. 19, 2000, incorporated herein by reference, discloses an iridium-based PROX catalyst dispersed on and supported by a porous, inert, three-dimensional refractory carrier. Common support materials disclosed are MgO; CaO; $Ca_2SiO_4$; BaO; $Ca_3SiO_5$; $ZrO_2$; $CeO_2$; $Cr_2O_3$; $La_2O_3$; $ThO_2$; alpha, delta gamma, and theta alumina ($Al_2O_3$), and combinations thereof; silicas and silicates; sodium borosilicate; $TiO_2$; $MgAl_2O_4$; $ZnCr_2O_4$; $CaSiO_3$; $SiO_2$; $SiO_2$—$Al_2O_3$; and clay such as bentonite. The preferred carrier is a mixture of alumina and sodium borosilicate. The treatment of the feed gas by the catalyst is carried out preferably at a temperature between about 80° C. and 300° C., more preferably between about 210° C. and 260° C., resulting in carbon monoxide gas concentrations below 20 ppm, and preferably below 10 ppm. When the iridium catalyst is dispersed on a carrier comprising 30 weight percent alumina and 70 weight percent sodium borosilicate, the carbon monoxide level is reduced to as low as 4 ppm at a temperature of 220° C.

European Patent Application EP 1038832, filed Sep. 26, 1997 by Toyota Motors and published Sep. 27, 2000, discloses an apparatus that reduces the concentration of carbon monoxide in a hydrogen-rich gas, using a PROX catalyst having ruthenium as a primary component but further including, in combination with the ruthenium, another metal that extends the effective temperature range in which the selective oxidation of carbon monoxide is accelerated. The combined metal may be an alkali metal, such as lithium or potassium, or an alkaline earth metal, such as barium. Also, nickel or zinc may be used. The carrier is alumina pellets, and the feed gas treatment is carried out at a temperature between about 100° C. and 200° C. Using a catalyst containing ruthenium at a level of 0.036 mole/liter (moles Ru/volume of alumina pellets) together with potassium at a level of 0.005 mole/liter (moles K/volume of alumina pellets), the concentration of carbon monoxide is reduced to levels of 22 ppm, 4 ppm, and 8 ppm at temperatures of, respectively, 100° C., 140° C., and 200° C.

It is known in the art to use aluminum oxides or stabilized aluminum oxides in PROX catalyst compositions. Stabilized aluminates typically have stabilizer in randomized locations, not necessarily locked in the C-axis of the crystal structure. For example, barium aluminates describes many compounds such as, but not limited to $BaAl_2O_4$. The barium content of barium aluminates can range from less than about 1 wt % to more than about 60 wt %. Barium aluminates as PROX support oxides are not relatively stable to strong fluxing agents such as metal hydroxides.

It is known further in the catalytic arts to use one or more hexaaluminate compounds in the formation of catalysts, for example, for reforming hydrocarbons as fuel for gas turbines and jet engines, for partially oxidizing methane to syngas, and for combustion of gasified biomass. Known hexaaluminates typically include one or more metals in the lattice, for example, barium, manganese, lanthanum, nickel, and strontium. Hexaaluminates generally have been found to be structurally stable at higher temperatures than conventional aluminum oxides. It is not known in the art to use hexaaluminates in PROX carbon monoxide catalysis.

It is a principal object of the present invention to provide an improved oxidizing catalyst composition that is preferential for carbon monoxide and has reduced susceptibility to carbon monoxide poisoning.

It is a further object of the invention to provide such a catalyst wherein the cost of precious metal components is reduced.

It is a still further object of the invention to provide such a catalyst whereby, in a flowing mixture of gases including hydrogen and carbon monoxide, the concentration of carbon monoxide is reduced to less than 5 parts per million.

SUMMARY OF THE INVENTION

Briefly described, a catalyst for preferentially reducing carbon monoxide in a hydrogen stream is formed from a chemical composition including a hexaaluminate, a metal hydroxide and a precious metal. The composition may be disposed on a support or may be extruded or coated or cast into or onto a support. Incorporation of hexaaluminates allows inclusion of metal hydroxides that flux the active precious metal surface at higher temperatures than can aluminum oxide-based catalytic compositions, thereby enhancing resistance of the catalyst and monolithic support and increasing the durability and thermal range of the PROX catalyst. An additional advantage is that lesser amounts of precious metal oxides need be deposited onto the hexaaluminate, while retaining activity similar to aluminum oxide compositions.

In one aspect of this invention, a reactor for selectively oxidizing carbon monoxide to carbon dioxide in the presence of hydrogen comprises a substrate; and a washcoat on said substrate containing the chemical composition. The substrate is preferably a plate, a monolith, a foil, or a rigid foam. Suitable material for the substrate include cordierite, silicon carbide, alumina, aluminum, ferrous material, stainless steel, and glass

DESCRIPTION OF THE PREFERRED EMBODIMENTS

A PROX catalytic composition in accordance with the invention generally comprises a hexaaluminate structural element stabilized by a stabilizer and supportive of a precious metal.

Preferred stabilizers disposed within the hexaaluminate crystalline structure may include Group Ia metals, Group IIa metals, rare earth metals, and combinations thereof. Hexaaluminate cations may include at least hafnium, scandium, zirconium, yttrium, cerium, lanthanum, praseodymium, neodymium, barium, and strontium. Group IIa stabilized hexaaluminates, in order of preference as crystal stabilizers, include barium ($BaAl_{12}O_{19}$), strontium ($SrAl_{12}O_{19}$) and magnesium ($MgAl_{12}O_{19}$). Rare earth stabilized hexaaluminates, in order of preference as crystal stabilizers, may comprise lanthanum ($LaAl_{11}O_{18}$) and cerium ($CeAl_{11}O_{18}$). Particularly useful combinations of Group IIa and rare earth stabilizers include barium-lanthanum ($Ba_{0.5}La_{0.7}Al_{11}O_{18}$) and strontium-lanthanum ($Sr_{0.8}La_{0.2}Al_{11}O_{18}$).

The preferred hexaaluminates may contain a precious metal in the crystal structure. Examples of preferred precious metal hexaaluminates include ruthenium-barium hexaaluminates ($Ru_{0.3}Ba_{0.7}Al_{11}O_{18}$), iridium-barium hexaaluminates ($Ir_{0.3}Ba_{0.7}Al_{11}O_{18}$), iridium-cerium hexaaluminates ($Ir_{0.3}Ce_{0.7}Al_{11}O_{18}$) and ruthenium-cerium hexaaluminates ($Ru_{0.3}Ce_{0.7}Al_{11}O_{18}$). Less preferred stabilizers disposed within the hexaaluminate crystalline structure may include base metals such as manganese, nickel, and iron. However, these base metals may increase the activity of precious metals in oxidizing carbon monoxide in the presence of hydrogen. Preferred base metal hexaaluminates are lanthanum-manganese ($LaMnAl_{11}O_{19}$), barium-manganese ($Ba_xMn_{1-x}Al_{12}O_{19}$), lanthanum-nickel ($LaNiAl_{11}O_{19}$), barium-nickel ($Ba_xNi_{1-x}Al_{12}O_{19}$), lanthanum-iron ($LaFeAl_{11}O_{19}$) and barium-iron ($Ba_xFe_{1-x}Al_{12}O_{19}$). When base metal hexaaluminates are used as support oxides, alkaline earth hydroxides preferably are not included in the PROX formulations. The base metals are able to coat the precious metal surface, reducing hydrogen consumption without reducing carbon monoxide oxidation.

Methods for making hexaaluminates are well known in the prior art.

The active metals include precious metals such as iridium, ruthenium, and platinum deposited upon the support oxide. For example, a preferred PROX catalyst comprises about 0.04 wt % to about 4.0 wt % iridium on a lanthanum hexaaluminate coated substrate. The hexaaluminate coated substrate can comprise, for example, a metal foil with a washcoat comprising 2.0 wt % ruthenium 94.0 wt % lanthanum hexaaluminate and 4.0 wt % potassium hydroxide. This can be accomplished by dipping a metal foil into a lanthanum hexaaluminate and potassium hydroxide slurry, then calcining at elevated temperatures, then dipping the hexaaluminates coated substrate into a solution of precious metal hydroxide solution, and then calcining again.

It is possible for different fractions of hexaaluminate to be applied to a single substrate. For example, one fraction may consist of iridium-catalyzed lanthanum hexaaluminates and potassium hydroxide, and a second fraction may be ruthenium-doped barium hexaaluminate and potassium hydroxide. The substrate may then be coated with a formulation containing about 35 weight percent (wt %) to about 65 wt % of the first fraction and containing about 65 wt % to about 35 wt % of the second fraction.

A PROX catalyst in accordance with the invention includes an alkaline metal hydroxide such as lithium hydroxide, sodium hydroxide, potassium hydroxide, rubidium hydroxide, strontium hydroxide, barium hydroxide and combinations thereof.

The catalyst composition is disposed in a reactor for treating a hydrogen gas stream to oxidize carbon monoxide to carbon dioxide. The reactor comprises a substrate onto which a washcoat containing the catalyst composition is applied, as in the examples that follow. The substrate may be in the form of conventional foils, porous foam structures, extruded monoliths and the like, as is well known in the art, as well as combinations comprising at least one of the foregoing forms. For example, the substrate can be cordierite, alumina, zirconium toughened aluminum, silicon carbide, ferrous material, stainless steel, glass, and aluminum. Hexaaluminates are used as washcoat on the metal plates, ceramic foams and extruded monoliths.

EXAMPLES OF PROX CARBON MONOXIDE CATALYSTS IN ACCORDANCE WITH THE INVENTION

Example 1

A stainless steel plate was coated with slurry containing barium hexaaluminate, potassium hydroxide, and ruthenium hydroxide and platinum hydroxide, then was calcined at about 500° C. for 4 hours. The resulting catalytic element had a washcoat consisting of 3.76 g/in$^3$ barium hexaaluminate, 0.16 g/in$^3$ potassium hydroxide, and 0.04 g/in$^3$ platinum, and 0.04 g/in$^3$ ruthenium.

Example 2

A stainless steel plate was coated with slurry containing iron hexaaluminate and iridium hydroxide, then was calcined at about 500° C. for 4 hours. The resulting catalytic element had a washcoat consisting of 3.92 g/in$^3$ iron hexaaluminate and 0.08 g/in$^3$ iridium.

Example 3

A stainless steel plate was coated with a first slurry containing barium hexaaluminate, potassium hydroxide and iridium hydroxide, then was calcined at about 500° C. for 4 hours. The first calcined washcoat consisted of 3.76 g/in$^3$ barium hexaaluminate 0.16 g/in$^3$ potassium hydroxide and 0.08 g/in$^3$ iridium. The plate was then coated with a second slurry containing barium hexaaluminate, potassium hydroxide, platinum hydroxide, and ruthenium hydroxide, then was calcined at about 500° C. for 4 hours. The second calcined washcoat consisted of 3.68 g/in$^3$ barium hexaaluminate, 0.16 g/in$^3$ potassium hydroxide, 0.08 g/in$^3$ platinum, and 0.08 g/in$^3$ ruthenium.

Example 4

A stainless steel plate was coated with slurry containing solids of 65 wt % iridium-barium hexaaluminates and 35 wt % ruthenium-lanthanum hexaaluminates. The metal plate with washcoat was calcined at 500° C. for 4 hours.

Example 5

A ruthenium-barium hexaaluminate ($Ru_{0.3}Ba_{0.7}Al_{11}O_{18}$) slurry was made by mixing aluminum isopropoxide, barium isopropoxide, and ruthenium amine hydroxide in isopropyl alcohol. Hydrolysis of the metal alkoxides in acidic alcoholic solution allowed formation of ruthenium barium-hexaaluminate. The formed hexaaluminate was calcined at 925° C.

Example 6

A stainless steel plate was coated with slurry containing ruthenium-barium hexaaluminates and potassium hydroxide then calcined at about 500° C. for 4 hours. The calcined metal plate had a washcoat consisting of 3.84 $g/in^3$ barium hexaaluminate and 0.16 $g/in^3$ potassium hydroxide.

Example 7

Barium hexaaluminate was mixed with phosphoric acid. The mixture was extruded into a monolithic form containing 400 cells per square inch. The monolith was dried and calcined to 800° C. for 4 hours. The calcined monolith was doped with iridium hydroxide and potassium hydroxide then calcined at 500° C. for 4 hours.

Example 8

Barium hexaaluminate was mixed with phosphoric acid. The mixture was poured over polyurethane foam. The slurry-foam was dried and calcined at 1000° C. for 4 hours. The calcined foam support was doped with iridium hydroxide and potassium hydroxide then calcined at 500° C. for 4 hours.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A reactor for selectively oxidizing carbon monoxide to carbon dioxide in the presence of hydrogen, comprising:
   a) a substrate; and
   b) a washcoat on said substrate having been coated from a slurry, said washcoat containing a catalyst composition consisting essentially of including
   a hexaaluminate containing a cation selected from the group consisting of iron, barium, strontium, cerium, hafnium, scandium, zirconium, yttrium, praseodymium, neodymium, magnesium, lanthanum, barium-lanthanum, strontium-lanthanum, and combinations thereof,
   an alkali and/or alkaline earth metal hydroxide, and
   a precious metal,
   wherein the catalytic composition containing an alkali and/or alkaline earth metal ion selectively oxidizes carbon monoxide to carbon dioxide.

2. A reactor in accordance with claim 1 wherein the form of said substrate is selected from the group consisting of a plate, a monolith, a foil, and a rigid foam.

3. A reactor in accordance with claim 1 wherein the material of which said substrate is formed is selected from the group consisting of cordierite, silicon carbide, alumina, aluminum, ferrous material, stainless steel, and glass.

4. A reactor in accordance with claim 1 wherein said alkali and/or alkaline earth metal hydroxide is selected from the group consisting of lithium hydroxide, sodium hydroxide, potassium hydroxide, rubidium hydroxide, strontium hydroxide, barium hydroxide, and combinations thereof.

5. A reactor in accordance with claim 1 wherein said precious metal is selected from the group consisting of iridium, ruthenium, platinum, and combinations thereof.

* * * * *